UNITED STATES PATENT OFFICE.

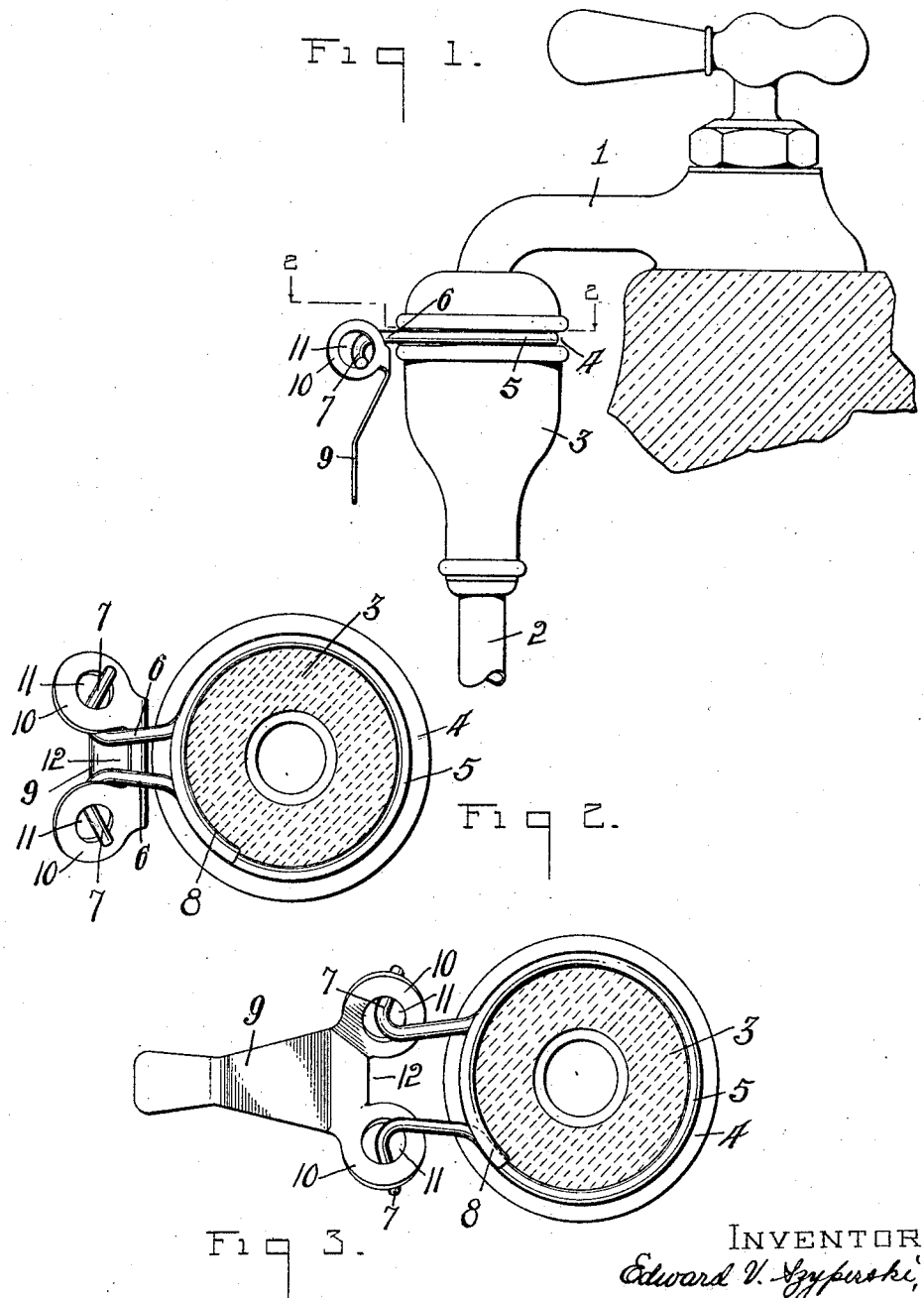

EDWARD V. SZYPERSKI, OF TOLEDO, OHIO.

HOSE CLAMP.

1,406,242.      Specification of Letters Patent.      Patented Feb. 14, 1922.

Application filed June 27, 1921. Serial No. 480,572.

*To all whom it may concern:*

Be it known that I, EDWARD V. SZYPERSKI, a citizen of the United States, and a resident of Toledo, in the county of Lucas and State of Ohio, have invented a certain new and useful Hose Clamp; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to clamps and particularly to those adapted to clamp a hose or other tubular compressible member to a faucet nozzle or other firm member to provide a water tight connection therebetween.

The object of my invention is the provision of a simple and improved clamp of the class described which is light and inexpensive in its construction and easily operable to effect a compression of an object which it encircles or permit an expansion thereof.

The invention is fully described in the following specification, and while, in its broader aspect, it is capable of embodiment in numerous forms, a preferred embodiment thereof is illustrated in the accompanying drawings, in which:

Figure 1 is an elevation of a faucet with a hose attached thereto by a clamp embodying the invention. Fig. 2 is an enlarged section on the line 2—2 of Fig. 1 with the clamp in restricted or clamping position, and Fig. 3 is a similar view with the clamp in expanded or released position.

Referring to the drawings, 1 designates a water faucet and 2 a hose having at one end an enlarged compressible head 3 of rubber or other suitable material having an opening longtudinally therethrough in communication with the hose opening and adapted to closely receive the nozzle end of the faucet. The head 3 is provided, around the portion thereof which receives the faucet nozzle, with an annular groove for receiving a clamping wire or band 5, preferably of spring material so that it will normally remain in expanded relation to the head.

The band 5 forms a loop which extends almost entirely around the head 3 and has its free end portions 6, 6 extending outward from the head at one side of its axis in transversely spaced relation and each terminating with an outwardly, downwardly and slightly rearwardly extending end 7. To facilitate a compressing of the band, the loop portion thereof at one end has a channeled tongue 8 projecting therefrom to close the space between the outwardly projecting end portion 6 and to provide a hard portion on which the other end portion of the band loop may rest.

The operating member for the band comprises a lever member 9 having one end thereof provided with laterally spaced ears 10, which have openings 11 therein to render them of ring form and project forward from the lever on an incline which is less than a right angle. The ears 10 are also outwardly inclined with respect to each other so that the band ends 6 may be projected therebetween with their ends 7 extended out through the openings 11. The bent end 7 of the bands serve as hooks for entering and retaining the lever in engagement therewith and also as fulcrum studs on which the lever pivots.

It is evident that when the lever either extends upward from the band with its ears directed toward the head 3, or extends outward therefrom, the clamp is in open position and that when the lever is drawn downward so that the outer side thereof with respect to the ears is drawn toward the head 3, the inner sides of the ears will have a cam action on the leg portions 6 of the band and draw them toward each other to effect a contraction of the band about the head 3 and a consequent close compression of the head around the faucet nozzle. When the clamp is completely contracted the handle of the lever will extend downward and the portions 6 of the band will be confined within and project from the space 12 between the ears 10. The space 12 is slightly broadened at its inner end to permit the leg portions 6 of the band to seat therein thus tending to hold the lever in clamping position. When the lever has been swung outward far enough from its clamping position to withdraw the broadened end of the space 12 from the leg portions 6, the spring action of the band will exert a sufficient pressure against the cam surface of the ears to normally throw the lever to open position. When the lever is being turned into clamping position, the end portions 7 of the band bear against a wall in the opening 11 of each ear 10 to act as a fulcrum about which the lever is turned.

It is evident that I have provided a simple and efficient clamping device composed of two members which may be easily assembled or disassembled and which are operable to quickly clamp the compressible head member 3 to a faucet 1 or release the same.

I wish it understood that my invention is not limited to any specific construction, arrangement or form of the parts as it is capable of numerous modifications and changes without departing from the spirit of the claims.

Having thus described my invention, what I claim as new and desire to secure by Letters Patent, is,—

1. A clamp of the class described comprising a compressible loop member having adjacent laterally spaced outwardly extending leg portions with their outer ends directed outward to form pivots, a lever having its inner end forked with the furcations thereof forming adjacent cam surfaces and having openings therein for receiving the pivot ends of the respective leg portions whereby the lever is fulcrumed thereon, the inner sides of the furcations coacting with the leg portions of the loop members to effect a contraction of the member when the lever is turned in one direction.

2. A clamp of the class described comprising a compressible loop member having its ends extending outwardly in adjacent relation to form legs with their outer ends extending outward in opposite directions to form fulcrum studs, a lever having ears projecting from one end thereof in transversely spaced relation and being angled with respect to the lever and to each other, each ear having an opening therein for loosely receiving a fulcrum stud of the loop member with the leg portions of the member extending between the ears, the inner sides of the ears forming cam surfaces for coaction with the leg portions of the member to effect a contraction thereof when the lever is turned in one direction.

3. A clamp of the class described comprising a lever having apertured ears projecting in diverging planes from an end thereof in angular relation to the lever handle and with their inner faces inclined to each other, a clamping member of loop form having legs which project from the loop at one side thereof in spaced relation between the ears of the lever and having their outer ends projected outward in opposite directions loosely through the apertures of the ears to form fulcrum studs for the lever, the adjacent edges of the ears forming cam surfaces which act on the leg portions of the loop to effect a contraction thereof when the lever is turned in one direction.

4. In combination, a compressible member having an opening therethrough, a clamping band extending around the member in engagement therewith and having its ends projected outward from the member in laterally spaced relation to form leg portions with the terminal ends thereof bent outward to form fulcrum studs, and a lever having perforated ears projecting from one end thereof with adjacent studs disposed at an angle to each other, the ears being perforated to receive the outwardly projecting fulcrum studs of the band and the adjacent edges of the ears being of cam form to coact with the leg portions of the band and effect a contraction thereof when the lever is turned in one direction, the space between the ears being enlarged at its inner end to form recesses for receiving and yieldingly holding the leg portions of the band when the lever is in clamping position.

In testimony whereof I have hereunto signed my name to this specification.

EDWARD V. SZYPERSKI.